United States Patent [19]
Bech

[11] 3,954,036
[45] May 4, 1976

[54] COMBINATION SAW

[75] Inventor: Otto Mathias Andreas Bech, Arhus C., Denmark

[73] Assignee: James L. Brown, Shreveport, La.

[22] Filed: June 13, 1975

[21] Appl. No.: 586,669

[52] U.S. Cl. .............................. 83/749; 83/751; 83/752; 83/784; 83/790
[51] Int. Cl.² .................. B23D 57/00; B27B 13/00; B27B 19/06
[58] Field of Search ............ 83/749, 751, 752, 784, 83/790

[56] References Cited
UNITED STATES PATENTS

| | | |
|---|---|---|
| 174,950 | 3/1876 | Spire ........................ 83/749 |
| 382,330 | 5/1888 | Snedeker ................... 83/749 X |

Primary Examiner—Frank T. Yost
Attorney, Agent, or Firm—John M. Harrison

[57] ABSTRACT

A combination band saw, scroll saw and jigsaw having multiple blades driven by a common power source through a system of pulleys and belts, the jigsaw and scroll saw of which are activated by means of a belt-activated drive rod and piston rod system. The band saw is carried by a series of pulleys and the combination saw may be operated with all three blades simultaneously in operable position, or, in the alternative, each blade may be activated individually.

10 Claims, 3 Drawing Figures

U.S. Patent  May 4, 1976  3,954,036
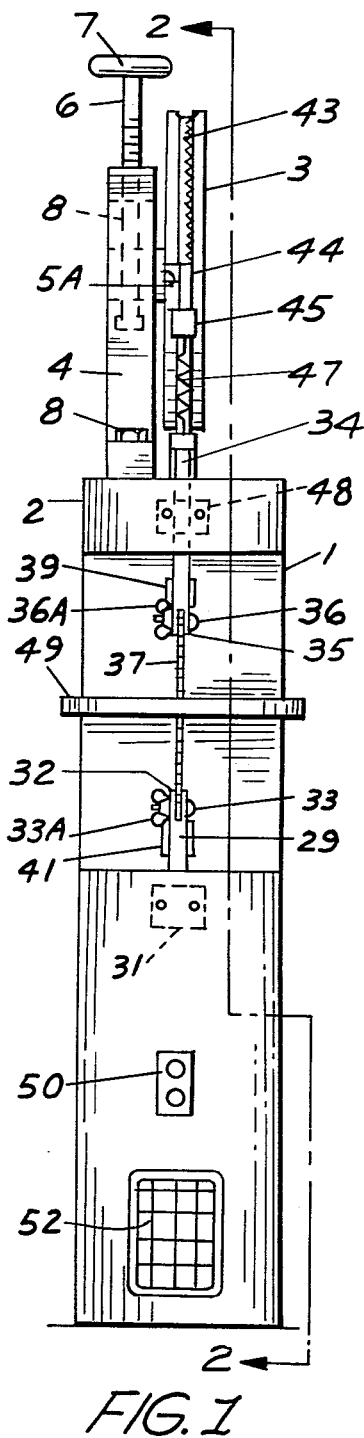
FIG.1
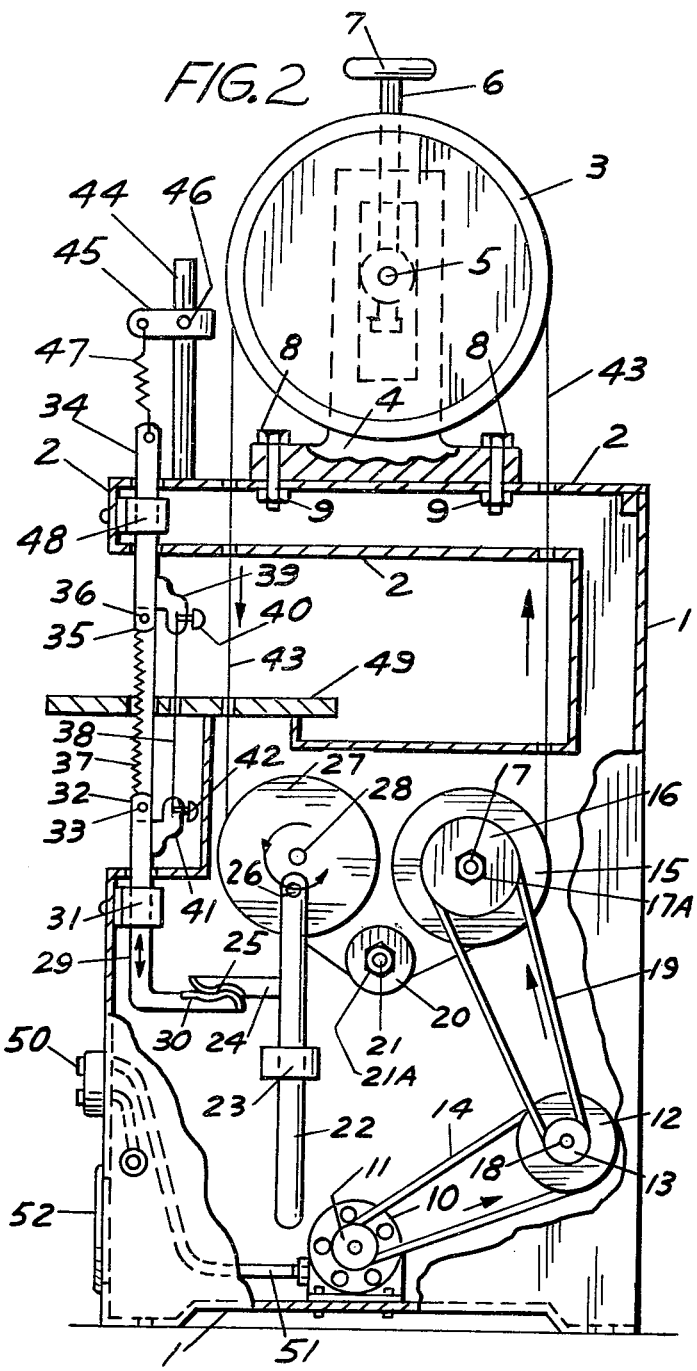
FIG.2
FIG.3

COMBINATION SAW

BACKGROUND OF THE INVENTION

1. Field of the Invention

This invention relates to wood working equipment, and more particularly, to a combination jigsaw, scroll saw and band saw, each function of which can be individually activated, or all of which can be activated in concert, as desired. The combination saw is driven by a common power source in cooperation with a system of pulleys, belts and a drive rod and piston rod assembly, which system is simple and easy to operate. The band saw is adapted to traverse three pulleys and a guide wheel, and the jigsaw and scroll saw are both operable from a single piston rod system in cooperation with a drive rod, the latter of which is activated by the band saw blade which acts as a drive belt. Alternatively, when it is desired that the band saw blade be removed from the pulleys, the drive rod may be activated by means of a belt substituted for the band saw blade, as hereinafter described. Motion between the drive rod and the piston rod system, which carries both the jigsaw blade and the scroll saw blade, is initiated by irregularly shaped, mating, bronze-lined faces cooperating in a rocking motion as the drive rod is activated.

2. Description of the Prior Art

Heretofore, the chief methods of achieving versatility in an existing shop tool was by the provision of accessory equipment which could be adapted to fit an existing primary drive system. For example, a band saw might be designed so that the band saw mechanism can be removed and a circular saw installed in its place. Likewise, a circular saw system may be converted into a sander or grinder by simply positioning a sanding or grinding face on the drive mandrel of the saw and utilizing the rotation of that mandrel to achieve the desired grinding or sanding operation. It is significant that most of these devices require a varying degree of modification to the equipment before a desired operation can be carried out. for example, if the tool is set up for cutting with a circular saw blade, generally speaking, some modification to the equipment is necessary to convert the tool into a grinder or a sander. Likewise, if the equipment is set up for jigsaw cutting it usually must be modified in order to convert the operation into an alternative configuration.

Accordingly, it is an object of the instant invention to provide a combination saw with a jigsaw blade, a scroll saw blade and a band saw blade, all available for use simultaneously by the activation of a single power source and without modification of the equipment.

Another object of the invention is to provide a combination saw which includes the jigsaw, scroll saw and band saw functions, each of which is susceptible of being used individually or simultaneously, as desired, with a minimum of manipulation to convert the equipment from one function to the other.

Yet another object of the invention is to provide a combination saw which utilizes a single power source and a unique mechanical cooperation between irregularly shaped, mating faces disposed between the drive rod and piston rod systems to achieve the scroll saw and jigsaw operational function.

A still further object of the invention is to provide a new and improved combination jigsaw, scroll saw and band saw, each function of which can be utilized individually without the other functions, or, in the alternative, all three functions of which may be utilized in a single operation, as desired.

A still further object of the invention is to provide a new and improved combination jigsaw, scroll saw and band saw which includes a pulley system for carrying a continuous band saw blade, which pulley system and band saw blade is contemporaneously used to drive a drive rod and piston rod assembly for operating the jigsaw and scroll saw blades.

Yet another object of the invention is to provide a combination jigsaw, scroll saw and band saw which includes a drive system consisting of a pulley having a drive rod eccentrically and rotatably pivoted thereon, which drive rod is in cooperation by means of cooperating, mating faces, with a piston rod system for activating the jigsaw and scroll saw.

SUMMARY OF THE INVENTION

These and other embodiments of the invention are provided in a combination saw having the following elements:

1. A frame having an upper frame arm and a work plate disposed opposite the frame arm; and 2. A system of pulleys designed to carry a band saw blade, and a drive rod and piston rod assembly designed to carry jigsaw and scroll saw blades, which elements are in cooperation with a drive source by means of drive belts for activating the respective blades.

BRIEF DESCRIPTION OF THE DRAWINGS

The invention will be better understood in view of the following description presented with reference to the accompanying drawings:

FIG. 1 of the drawings is a front elevation of the combination saw of this invention;

FIG. 2 is a sectional elevation taken along the lines 2—2 in FIG. 1 further illustrating the internal mechanism of the combination saw; and FIG. 3 is an elevation of the band saw pulley and attached band saw belt pulley which carry the band saw blade and band saw belt, respectively.

DESCRIPTION OF THE PREFERRED EMBODIMENTS

Referring now to FIGS. 1 and 2 of the drawing, the combination saw of this invention is illustrated, with frame 1, carrying frame arm 2, and work plate 49, having apertures (not illustrated) therein, and spaced from frame arm 2 in order to provide a working area. Overhead pulley 3 is designed to carry band saw blade 43 and is itself carried by overhead pulley shaft 5, and overhead pulley shaft mount 5A. Overhead pulley base 4 is mounted to frame arm 2 by means of overhead pulley base bolts 8 and overhead pulley base nuts 9. Overhead pulley 3 may be adjusted with respect to frame arm 2 by means of overhead pulley adjusting stem 6, which is in threaded cooperation with overhead pulley shaft mount 5A, and causes overhead pulley 3 to either move away from frame arm 2 or toward frame arm 2, depending upon the direction of rotation of overhead pulley adjusting stem 6. Overhead pulley adjusting stem handle 7 is provided as illustrated to facilitate clockwise or counterclockwise rotation of overhead pulley adjusting stem 6.

As more particularly illustrated in FIG. 2 of the drawing, band saw blade 43 is continuous, and in addition to traversing overhead pulley 3, also traverses band saw pulley 15, guide wheel 20 and drive rod pulley 27. Band saw blade 43 also traverses a cooperating aperture (not illustrated) in work plate 49. Drive motor 10, which is mounted to frame 1, is equipped with drive motor pulley 11 and cooperates with drive wheel 12 by means of continuous drive belt 14 carried by drive wheel pulley 13, which is mounted on a common drive wheel shaft 18, with drive wheel 12. Drive wheel pulley 13 in turn cooperates with band saw belt pulley 16, carried by band saw pulley 15 and mounted along with band saw pulley 15 on band saw pulley shaft 17, by means of band saw belt 19. Band saw pulley shaft bolt 17A is provided to prevent both band saw pulley 15 and band saw belt pulley 16 from slipping off of band saw pulley shaft 17. Since drive motor 10 is in cooperation with band saw pulley 15 by means of drive belt 14 and band saw belt 19, activation of drive motor 10 effects a counterclockwise rotation of band saw blade 43 on overhead pulley 3, band saw pulley 15, guide wheel 20 and drive rod pulley 27, as indicated by the arrow in FIG. 2. Guide wheel is mounted on guide wheel shaft 21 and is kept in place by guide wheel shaft nut 21A. Consequently, as a result of the function of these members, a work piece can be placed on work plate 49 and cut into a desired pattern by application of band saw blade 43, when drive motor 10 is activated.

Referring again to FIGS. 1 and 2 of the drawing, drive rod pulley 27 is rotatably mounted on drive rod pulley shaft 28 and also carries drive rod 22 by means of drive rod arm pin 26. Drive rod arm 24 is equipped wih drive rod arm seat 25, which is, in turn, releasably fitted to lower piston rod seat 30, carried by lower piston rod 29. Drive rod guide 23 serves to restrain drive rod 22 in a substantially reciprocating path as drive rod pulley 27 rotates, and lower piston rod guide 31 likewise serves to restrain lower piston rod 29 to a reciprocating action, as indicated by the arrow in FIG. 2 and as hereinafter more fully disclosed.

Lower piston rod 29 is fitted with lower piston rod clamp 32 adapted to receive one end of jigsaw blade 37. Lower piston rod bolt 33, in cooperation with lower piston rod nut 33A serve to clamp jigsaw blade 37 securely in lower piston rod clamp 32. Disposed opposite lower piston rod 29, is upper piston rod 34, carrying upper piston rod clamp 35, equipped with upper piston rod bolt 36 and upper piston rod nut 36A. The opposite end of jigsaw blade 37 is securely positioned in upper piston rod clamp 35 by means of upper piston rod bolt 36 and upper piston rod nut 36A. Upper piston rod 34 is likewise constrained to reciprocate by means of upper piston rod guide 48, and is biased in an upward direction by tension rod spring 47. Tension rod spring 47 is carried by tension rod arm 45, which is in adjustable cooperation with tension rod 44 by means of tension rod adjusting screw 46. Accordingly, tension rod spring 47 causes a bias of upper piston rod 34 and hence jigsaw blade 37 and lower piston rod 29, in an upward direction. Tension in these members can be adjusted by adjustment of tension rod arm 45 on tension rod 44. Upper piston rod 34 also carried upper scroll saw blade clamp 39, equipped with upper scroll saw blade screw 40 for securely fastening one end of scroll saw blade 38 therein. In like manner, lower piston rod 29 carries a cooperating and oppositely disposed lower scroll saw blade clamp 41 and lower scroll saw blade screw 43 for securely positioning the opposite end of scroll saw blade 38 in lower scroll saw blade clamp 41. Thus, scroll saw blade 38 is positioned essentially parallel to jigsaw blade 37 and band saw blade 43, and may be operated contemporaneously with or independently of these blades. Both jigsaw blade 37 and scroll saw blade 38 traverse work plate 49 by means of cooperating apertures (not illustrated).

Accordingly, referring again to FIGS. 1 and 2 of the drawing, activation of drive motor 10 effects a counterclockwise rotation of band saw blade 43 and drive rod pulley 27. This rotation causes the pinned end of drive rod 22 to rotate in eccentric fashion on drive rod arm pin 26 in a counterclockwise direction, and to effect a rocking motion with respect to drive rod arm 24 and lower piston rod 29, on drive rod arm seat 25 and lower piston rod seat 30. Consequently, when drive rod 22 is constrained in a downward motion on its rotational and reciprocating axis, lower piston rod 29, jigsaw blade 37 and scroll saw blade 38 are forced downwardly to produce a cutting stroke. Conversely, as drive rod 22 moves upwardly on its rotational and reciprocating axis about drive rod pulley shaft 28, tension rod spring 47 causes upper piston 34, jigsaw blade 37, scroll saw blade 38 and lower piston rod 29 to move upwardly, thereby bringing jigsaw blade 37 and scroll saw blade 38 into position for another cutting cycle.

Referring now to FIG. 3 of the drawing, it will be appreciated that band saw blade 43 rides on shoulder 53 off band saw pulley 15. Furthermore, as heretofore discussed, band saw belt pulley 16 is mounted on band saw pulley 15 and is designed to carry band saw belt 19, which is preferably of the "vee"-belt design, as illustrated. It will be appreciated by those skilled in the art that under circumstances where it is desired to eliminate band saw blade 43 from is functional position, the blade can be removed from operation as follows. Overhead pulley adjusting handle 7 is rotated in a counterclockwise direction, causing overhead pulley 3 to move downwardly as overhead pulley adjusting stem 6 rotates inside threaded overhead pulley shaft mount 5A. After overhead pulley 3 is so relocated, band saw blade 43 can be slipped over the edge of overhead pulley 3 and removed from its position on band saw pulley 15, guide wheel 20 and drive rod pulley 27. In its place, a third drive belt may be positioned over band saw pulley 15, guide wheel 20 and drive rod pulley 27 to effect the desired rotation of drive rod pulley 27 in order to operate the jigsaw blade 37 and scroll saw blde 38, or either of these, as desired. Operation of either one of jigsaw blade 37 or scroll saw blade 38, either with or without operation of band saw blade 43, can be achieved by simply removing the blade which is not to be used.

It will be appreciated that the combination saw of this invention may be optionally equipped with air vent 52 to dissipate heat, and electrical conduit 51 in cooperation with control switch 50 is provided for activation and deactivation of drive motor 10. Furthermore, drive rod arm seat 25 and lower piston rod seat 30 are preferably formed of a malleable metal such as bronze, which will resist wear resulting from the rocking motion of drive rod 24 with respect to lower piston rod 29.

Having described my invention with the particularity set forth above, what is claimed is:

1. A combination saw compising:
   a. a frame;
   b. a motor mounted on said frame;
   c. a frame arm carried by the upper portion of said frame and a work plate carried by the lower portion of said frame and disposed opposite said frame arm, said work plate having at least one aperture therein;
d. an overhead pulley carried by said frame arm in vertical, adjustable relationship;
e. pulley means disposed in vertical relationship opposite and in alignment with said overhead pulley and below said work plate;
f. a continuous band saw blade traversing said overhead pulley, said pulley means and said aperture in said work plate;
g. belt means cooperating with said motor and said pulley means to drive said pulley means;
h. a drive rod disposed in eccentric cooperation with said pulley means and essentially in reciprocating cooperation with said frame to effect a reciprocating and rocking motion of said drive rod when said motor is activated;
i. a vertically disposed lower piston rod movably mounted on said frame and positioned below said work plate in cooperation with said drive rod;
j. a vertically disposed upper piston rod movably mounted on said frame above said work plate and in alignment with said lower piston rod;
k. means fitted to said lower piston rod and said upper piston rod for receiving the ends of a jigsaw blade and a scroll saw blade; and
l. bias means in cooperation with said upper piston rod for biasing said upper piston rod in an upward, vertical position.

2. The combination saw of claim 1 wherein said pulley means is a band saw pulley, a guide wheel and a drive rod pulley, each disposed to receive said band saw blade in movable relationship.

3. The combination saw of claim 1 wherein:
a. said pulley means is a band saw pulley, a guide wheel and a drive rod pulley, each disposed to receive said band saw blade in movable relationship; and
b. said drive rod is pinned to said drive rod pulley in rotatable, eccentric relationship.

4. The combination saw of claim 1 further comprising:
a. a drive rod arm carried in horizontal relationship by said drive rod;
b. a drive rod arm seat fitted to the free end of said drive rod arm; and
c. a lower piston rod seat fitted to said lower piston rod and cooperating with said drive rod arm seat to cause said lower piston rod, said jigsaw blade, said scroll saw blade and said upper piston rod to move vertically downwardly against the bias of said bias means in sequence when said jigsaw blade or said scroll saw blade is in functional position on said upper piston rod and said lower piston rod and said motor is activated.

5. The combination saw of claim 1 wherein:
a. said pulley means is a band saw pulley, a guide wheel and a drive rod pulley, each disposed to receive said band saw blade in movable relationship;
b. said drive rod is carried by said drive rod pulley in rotatable pinned, eccentric relationship, and further comprising;
a. a drive rod arm carried in horizontal relationship by said drive rod;
b. a drive rod arm seat fitted to the free end of said drive rod arm; and
c. a lower piston rod seat fitted to said lower piston rod and cooperating with said drive rod arm seat to cause said lower piston rod, said jigsaw blade, said scroll saw blade and said upper piston rod to move vertically downwardly against the bias of said bias means in sequence when said jigsaw blade or said scroll saw blade is in functional position on said upper piston rod and said lower piston rod and said motor is activated.

6. The combination saw of claim 1 wherein said work plate is adjustable.

7. The combination saw of claim 1 further comprising a drive wheel disposed above said motor and below said pulley means and said belt means in cooperation with said motor and said pulley means to drive said pulley means.

8. The combination saw of claim 5 further comprising:
a. a drive wheel disposed above said motor and below said band saw pulley; and
b. drive belts disposed between said drive wheel and said motor and said drive wheel and said band saw pulley, respectively, to drive said band saw pulley when said motor is activated.

9. The combination saw of claim 8 further comprising:
a. a band saw belt pulley carried by said band saw pulley;
b. a drive wheel pulley carried by said drive wheel;
c. a band saw belt carried by said band saw belt pulley and said drive wheel pulley to drive said band saw pulley when said motor is activated.

10. The combination saw of claim 9 further comprising a drive motor pulley and a drive belt carried by said drive motor pulley and said drive wheel to drive said drive wheel when said motor is activated.

* * * * *